United States Patent [19]

Gebben

[11] Patent Number: 4,545,261
[45] Date of Patent: Oct. 8, 1985

[54] SHAFT TORQUE MEASURING SYSTEM

[75] Inventor: Vernon D. Gebben, Oklahoma City, Okla.

[73] Assignee: International Harvester Company, Chicago, Ill.

[21] Appl. No.: 477,033

[22] Filed: Mar. 21, 1983

[51] Int. Cl.[4] ............................................. G01L 3/10
[52] U.S. Cl. ................... 73/862.33; 73/769; 340/870.16
[58] Field of Search ............... 73/862.33, 862.35, 773, 73/769; 340/531, 870.16; 374/154

[56] References Cited

U.S. PATENT DOCUMENTS

| 2,428,012 | 9/1947 | Collins, Jr. et al. | 73/862.35 X |
| 3,701,281 | 10/1972 | Sogner | 374/154 |
| 3,824,845 | 7/1974 | Huebner | 73/862.33 X |
| 4,096,743 | 6/1978 | Diamond | 73/862.33 |

FOREIGN PATENT DOCUMENTS 1087277 10/1980 Canada ................................. 374/154

OTHER PUBLICATIONS

"The Measurement of Shaft Torque in Micro-Alternators", *Journal of Physics E: Science Instrumentation,* Auckland et al., Nov. 1979, vol. 12.

Primary Examiner—James L. Rowland
Assistant Examiner—Brian R. Tumm
Attorney, Agent, or Firm—Dennis K. Sullivan; F. David AuBuchon

[57] ABSTRACT

A shaft torque measuring system comprising a transducer mounted on a slowly rotating shaft that produces an output voltage signal proportional to its torque; a voltage-to-current converter circuit for converting the output voltage signal from the sensor into a current signal; a brush and slip ring assembly for providing a means to transmit the current signal to a monitor station, and a voltage-to-current converter circuit for converting the current signal to a voltage signal which is proportional to the torque of the slowly rotating shaft.

2 Claims, 2 Drawing Figures

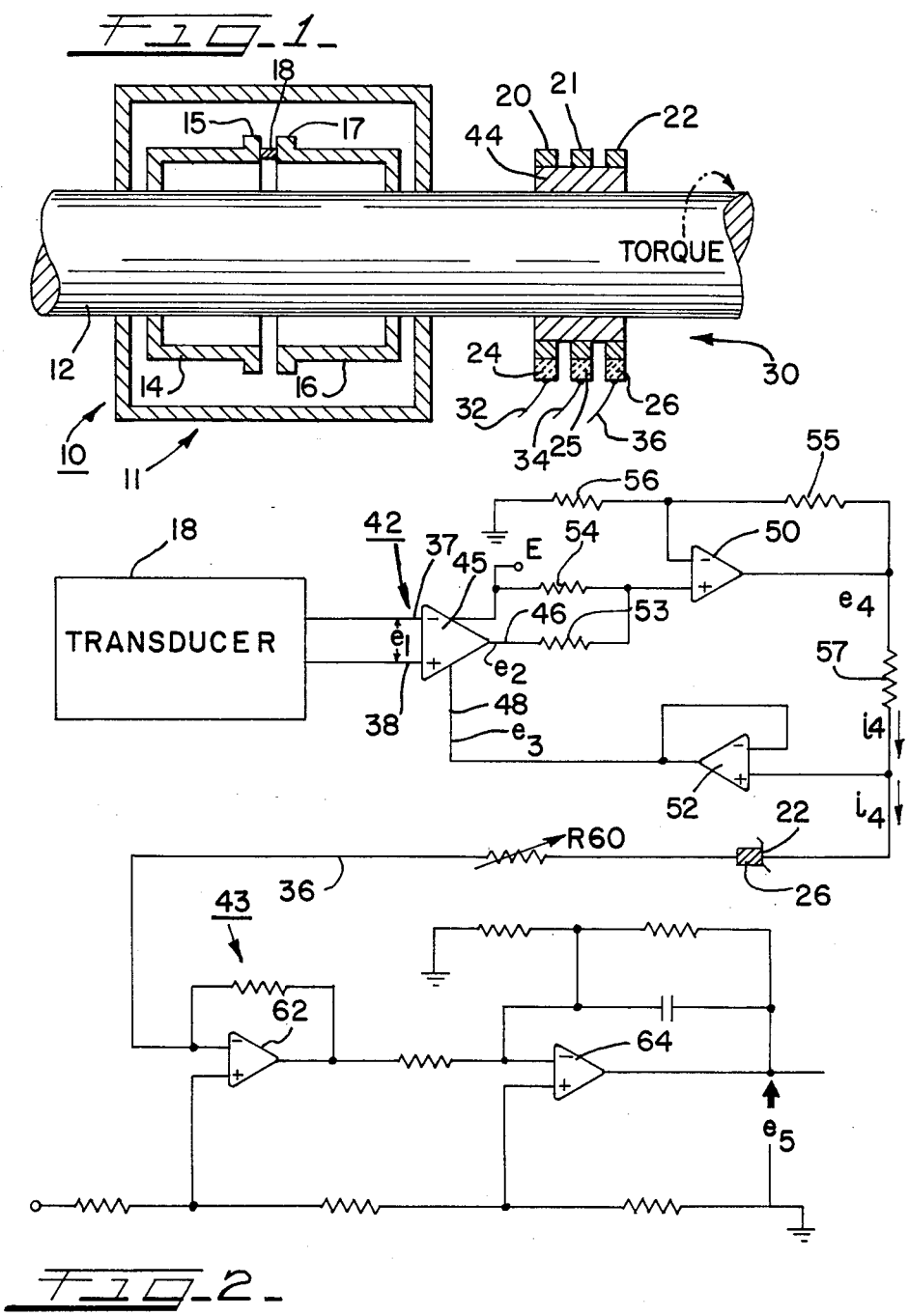

SHAFT TORQUE MEASURING SYSTEM

BACKGROUND OF THE INVENTION

As described in U.S. Pat. No. 4,096,743, shaft torque is commonly measured by determining the amount of twist in the shaft as a result of the torque exerted on the shaft. Conventionally, the twist is measured by means of a transducer attached at axially spaced-apart portions of the shaft such that the twisting stress on the transducer produces an electrical signal respresentative of shaft torque. In order to supply electrical power to the transducer and any electrical circuits mounted on the shaft, a slip ring and brush assembly is utilized in the prior art. The slip ring and brush assembly is mounted on the rotating shaft and transmits the electrical shaft torque signal produced by a transducer to an electrical stationary circuit which is calibrated to measure the shaft's torque. The disadvantage of prior art shaft torque measuring systems utilizing slip and brush assemblies is that the electrical contact between the brushes and the rings can deviate from an ideal connection due to variations in electrical resistance of the rings and brushes. To minimize the electrical resistance variations, it is necessary to use an expensive material for the slip rings and brushes. For this purpose, coin silver and silver-gold alloys are generally used for slip ring material. High quality brushes are made of alloys containing a mixture of gold, palladium, platinum and silver. These materials minimize the possibility of false signals resulting from tarnish embedment of foreign matter and variations in constriction resistance of the contact area.

This invention avoids the necessity for employing precious metals in the slip ring and brush assembly by converting the transducer voltage signals to current signals which are unaffected by changes in line and contact resistance.

SUMMARY OF THE INVENTION

This invention is directed to a shaft torque measuring system employing a displacement transducer mounted on the shaft which provides an electrical voltage signal in accordance with movements of the shaft, wherein the voltage signals are converted to proportional current signals by a novel voltage to current conversion circuit before the signal is conducted through the slip ring assembly, and wherein the current signal is then converted at a stationary monitor to a voltage signal proportional to the torque of the rotating shaft.

DESCRIPTION OF DRAWINGS

For better understanding of this invention, reference may be made to the accompanying drawings in which:

FIG. 1 is a partial, sectional view of a shaft for a vehicle on which a slip ring and brush assembly is mounted and a transducer and associated electronic circuitry for converting the transducer voltage signal to a current signal; and FIG. 2 is a schematic diagram of the circuit of the present invention for converting the voltage signal transmitted from a transducer to a current signal prior to transmission through a slip ring and brush assembly to the output stationary circuit, where it is converted to a voltage signal proportional to the shaft torque.

DESCRIPTION OF THE PREFERRED EMBODIMENT

There is shown in FIG. 1 a transducer assembly 10 mounted on a shaft 12. The transducer assembly 10 could be any of a variety of conventional transducers, such as a strain gauge bridge. The transducer assembly 10 shown in FIG. 1 is contained within a hollow ring housing 11 and comprises a pair of cylindrical shell structures 14 and 16 secured to the shaft at axially spaced-apart positions. The shells 14 and 16 have mounted between their respective outer flange portions 15 and 17 a displacement transducer 18 of the type adapted to produce an electrical voltage signal in accordance with the movement imposed thereon by the relative motion of shell structures 14 and 16 in direct responce to a slight twist in the shaft 12 whenever a torque is applied thereto, as is described in U.S. Pat. No. 4,096,743. Any conventional displacement transducer producing a displacement related electrical signal, such as a strain gauge bridge arrangement could be utilized.

Three slip rings 20, 21, and 22 and associated contacting brushes 24, 25, and 26 form a brush and slip ring assembly 30 to permit electrical connections to the rotating shaft 12. Leads 32 and 34 are connected with brushes 24 and 25, respectively, to supply electrical power to the displacement transducer 18 and to the other electrical circuits mounted within the housing 11. Rings 20, 21, and 22 are secured to an insulating mounting 44 carried by the shaft 12.

Circuit 42 (FIG. 2), located within housing 11, converts the transducer voltage signal to a current. Leads 37 and 38 transmit a differential voltage which is directly proportional to the shaft torque. The output of voltage-to-current converter 42 is connected to the current-to-voltage converter circuit 43 at a remote data center via the connections formed by ring 22, brush 26 and lead 36.

The transducer signal $e_1$, is applied to the input of a micro-power instrumentation amplifier 45. Amplifier LH0036, which is manufactured by the National Semiconductor Corporation, could be sued for amplifier 45. Its output voltage $e_2$ at terminal 46 equals the amplified value of voltage signal $e_1$, plus the feedback signal $e_3$ at terminal 48.

Amplifiers 50 and 52 are general purpose low power, single supply, operational amplifiers. Amplifier 50 is connected to resistors 53, 54, 55 and 56 in a manner to form a unity gain voltage follower with voltage offset for operating the entire circuit on a single voltage d-c power supply E. Operational amplifier 52 is connected as a high impedance voltage follower for purpose of providing a feedback voltage $e_3$ on terminal 48 while drawing a negligible amount of current from the output current signal $i_4$; and is connected between a load resistor 57 and the instrumentation amplifier 45.

The following set of equations show that the output current $i_4$ is directly proportional to the amplified transducer voltage signal $e_1$ plus a bias signal.

As stated above, the output voltage $e_2$ at terminal 46 is equal to:

$$e_2 = Ke_1 + e_3 \qquad (1)$$

where K is the gain of instrumentation amplifier 45.

The output current signal $i_4$ is equal to:

$$i_4 = \frac{1}{R_{57}} (e_4 - e_3) \quad (2)$$

Combining equation (1) and (2)

$$i_4 = \frac{1}{R_{57}} (e_4 - e_2 + Ke_1) \quad (3)$$

Where:

$$e_4 = \left(\frac{R_{54}}{R_{56}}\right) \left(\frac{R_{55} + R_{56}}{R_{53} + R_{54}}\right) e_2 + \quad (4)$$

$$\left(\frac{R_{53}}{R_{56}}\right) \left(\frac{R_{55} + R_{56}}{R_{53} + R_{54}}\right) E$$

If $\frac{R_{53}}{R_{54}} = \frac{R_{55}}{R_{56}}$ ; and $R_{53} = R_{55}$ then:

$$e_4 = e_2 + \frac{R_{55}}{R_{56}} E \quad (5)$$

Combining equations (2) and (5):

$$i_4 = \frac{1}{R_{57}} (K e_1) + \frac{(R_{55})(E)}{(R_{56})(R_{57})}$$

Hence, the output current is equal to the amplified transducer voltage signal plus a bias signal.

The output current $i_4$ is delivered to a current-to-voltage converter circuit 43, remotely located at a data center in the tractor cab, through a brush and slip ring assembly 30. The variable resistance of the slip ring is represented by $R_{60}$. Operational amplifiers 62 and 64 convert and amplify the output current signal to a proportional voltage signal $e_5$.

Tests have demonstrated that the sliding contact resistance $R_{60}$ could increase to 2,000 ohms before the current output is unable to reach the value corresponding to 10% of the rated input. The significance of this figure is the expected resistance of a stainless steel slip ring and copper-graphite brush assembly is less than 2,000 ohms. Thus, it is possible to use the less expensive slip ring brush assembly when following the principles of this invention.

What is claimed is:

1. A measuring system for determining the torque of a slowly rotating shaft, comprising:
    (a) transducer means mounted on said shaft for producing an output voltage signal proportional to the shaft's torque,
    (b) a voltage-to-current converter circuit coupled to said transducer means for converting said output voltage signal to a proportional current signal, said circuit being contained in a housing carried by said shaft,
    (c) a brush and ring assembly mounted on said shaft and coupled to said converter circuit for transmitting said current signal from said shaft to a monitor station,
    (d) a current-to-voltage converter located at said monitor station and coupled to said brush and ring assembly for converting said current signal to a voltage signal that is proportional to the torque of said slowly rotating shaft, and
    (e) said voltage-to-current converter circuit including an instrumentation amplifier coupled to said transducer means for amplifying said output voltage signal, a unity gain voltage follower coupled to the output of said instrumentation amplifier, a load resistor connected between the output of said unity gain voltage follower and said brush and slip ring assembly, and a high input impedance voltage follower which is coupled between said load resistor and said instrumentation amplifier and which provides a voltage feedback signal from said load resistor to said instrumentation amplifier.

2. A measuring system as defined in claim 1, wherein said brush and slip ring assembly includes slip rings of stainless steel material and brushes of coppergraphite.

* * * * *